United States Patent [19]

Falzoni

[11] Patent Number: 4,787,268

[45] Date of Patent: Nov. 29, 1988

[54] STEP CHANGE-SPEED TRANSMISSION WITH CENTRIFUGAL CLUTCH

[75] Inventor: Gianluigi Falzoni, Turin, Italy

[73] Assignee: Fiat Auto S.p.A., Turin, Italy

[21] Appl. No.: 36,511

[22] Filed: Apr. 9, 1987

[30] Foreign Application Priority Data

Apr. 23, 1986 [IT] Italy ................................ 67339 A/86

[51] Int. Cl.⁴ .............................................. F16H 37/00
[52] U.S. Cl. .................................. 74/689; 192/103 FA
[58] Field of Search ......................... 74/689, 701, 700; 192/103 FA, 105 F

[56] References Cited

U.S. PATENT DOCUMENTS

| | | | |
|---|---|---|---|
| 3,340,749 | 9/1967 | Magg et al. ........................... | 74/689 |
| 3,833,100 | 9/1974 | Aschauer ................. | 192/103 FA X |
| 4,006,808 | 2/1977 | Starling et al. ............... | 192/103 FA |
| 4,241,618 | 12/1980 | Smirl ..................... | 74/863 |
| 4,271,724 | 6/1981 | Morscheck ........................ | 74/720 |
| 4,294,137 | 10/1981 | Piret et al. ....................... | 74/689 X |
| 4,318,311 | 3/1982 | Ross ......................... | 192/103 FA X |
| 4,361,217 | 11/1982 | Bieber et al. .................. | 192/103 FA |
| 4,478,105 | 10/1984 | Yamamuro et al. .............. | 74/689 X |
| 4,526,062 | 7/1985 | Sakakibara et al. .............. | 74/701 X |
| 4,530,256 | 7/1985 | Hattori .................................. | 74/689 |

FOREIGN PATENT DOCUMENTS

| | | | |
|---|---|---|---|
| 977041 | 3/1951 | France .......................... | 192/103 FA |
| 59-99125 | 6/1984 | Japan ................................ | 192/105 F |
| 85/02663 | 6/1985 | PCT Int'l Appl. ................... | 74/701 |

Primary Examiner—Lawrence Staab
Assistant Examiner—Dwight G. Diehl
Attorney, Agent, or Firm—Sughrue, Mion, Zinn, Macpeak and Seas

[57] ABSTRACT

Stepwise change-speed transmission between the engine and the drive shafts of the driven wheels of a motor vehicle including expansible driving and driven pulleys supported respectively by a main shaft and a driven shaft, and a friction clutch mounted on the driven shaft to transmit drive from the driven pulley to a differential through a geared reversing unit for engaging forward drive and reverse drive. The reversing unit is designed in such a manner as to maintain the forward drive in permanent engagement and can be actuated by a hydraulic actuator to engage the reverse drive.

6 Claims, 3 Drawing Sheets

STEP CHANGE-SPEED TRANSMISSION WITH CENTRIFUGAL CLUTCH

The present invention refers to stepless change-speed transmissions between the engine and the drive shafts of the driven wheels of a motor vehicle.

In particular, the invention relates to a transmission of the type comprising a main shaft bearing an expansible driving pulley, a driven shaft bearing an expansible driven pulley, a drive belt which passes around the driving and driven pulleys and hydraulic control means for varying the transmission ratio between the driving and driven pulleys, an epicyclic differential rotatable by the driven shaft to drive the drive shafts, a geared reversing unit for reversing the sense of rotation of the differential to effect forward or reverse motion respectively, hydraulic actuator means for controlling the reversing means, and a hydraulically-operated friction clutch for engaging and disengaging the transmission.

In stepless change-speed transmissions of the type defined above the sub-units which constitute the transmission are generally arranged so as to require the use of a plurality of shafts and gears to enable the engagement of forward drive and reverse. These constructional complications derive essentially from the fact that, in known transmissions, the reversing unit for engaging forward drive and reverse as well as the friction clutch are normally associated with the main shaft.

Another drawback of the known transmission arrangements lies in the fact that the various components must necessarily be assembled by the successive assembly of the various constitutents of the unit one at a time in the assembly stage which takes a long time and thus involves substantial costs.

The object of the present invention is to avoid the above-mentioned drawbacks and to provide a stepless change-speed transmission of the type defined above, the components of which are disposed in such a manner as to make the transmission more efficient and simpler to construct as a result of a reduction in the number of components required, and the possibility of automatic pre-assembly of these components into sub-units which can subsequently also be assembled automatically.

According to the invention this object is achieved by virtue of the fact that the friction clutch of the transmission is disposed on the driven shaft and includes a driving member actuated by the driven pulley and a driven member for actuating the reversing unit, and in that the reversing unit comprises:

a drive gear for forward drive rotatably mounted on the driven shaft and a driven gear engaged with the drive gear through transmission means, a toothed sleeve coaxial with the driven shaft and coupled for rotation with the driven member of the friction clutch, the toothed sleeve normally being meshed with the drive gear for the forward drive and displaceable axially by the hydraulic actuator means to a position of disengagement from the drive gear for the forward drive;

a driven gear for reverse able to mesh directly with the toothed sleeve when the latter is in its disengaged position; and transmission means between said driven gears for forward drive and reverse motion and the differential.

The arrangement of the friction clutch and the design of the reversing unit according to the invention, on the one hand avoids the need to employ a series of additional shafts and gears which are indeed required in the case of conventional transmissions in which the engagement of the drives is effected on the main shaft and, on the other hand, ensures that the transmission is more efficient, particularly because of the greater efficiency of the friction clutch. As will become more evident below, the arrangement of the friction clutch enables it to carry out three important functions simultaneously, that is, a separating function, a pulling away function and an auto-lock-up function.

A further advantage of the arrangement of the transmission of the invention lies in the fact that every sub-unit constituting the transmission can be assembled automatically away from the production line, thus enabling the sub-units to be pre-checked before subsequent final assembly, again with the aid of automation.

A further constructional simplification of the transmission lines in the particular design of the reversing unit, which is designed in such a manner as to keep the forward drive permanently engaged and to require an active control only for engagement of reverse.

According to the invention the friction clutch includes an actuating cylinder fixed to the driving member of the clutch and defining a thrust chamber connected to a hydraulic supply circuit and to a hydraulic exhaust duct housing a normally-open modulating valve which is rotatable with the actuator and has a centrifugal closing action.

The use of the modulating valve in the friction clutch makes it possible to obtain a pull-away characteristic dependent on the angular velocity of its driving member, similar to that of centrifugal clutches of mechanical type.

In addition, by means of this modulating valve, it is possible to cool the friction members of the clutch efficiently during the skidding stage on pulling away.

According to the invention this modulating valve comprises a radially-slidable centrifugal mass carrying an obturator which cooperates with a valve seat formed in the exhaust duct.

Preferably, the centrifugal mass is constituted by a substantially cup-shaped slide the cavity of which defines a pressure chamber communicating with the hydraulic supply circuit and with the function of balancing the centrifugal force acting on the centrifugal mass.

This design of the modulating valve further improves the modulating effect on the friction clutch on pulling away.

According to another aspect of the invention the movable half-pulley of the driving pulley has an associated spring the loading of which varies in dependence on the gear ratio, and which ugres the movable half-pulley towards the fixed half-pulley.

According to a further aspect of the invention, the movable half-pulley of the driven pulley may be moved by means of an hydraulic actuating cylinder having a thrust chamber connected in series with a chamber for compensating for pressure variations in the thrust chamber due to the centrifugal effect.

This avoids the risk of undesirable variations in the gear ratio due to pressure increases in the thrust chamber due to the centrifugal action.

Further characteristics and advantages of the invention will become clear during the detailed description which follows, with reference to the appended drawings supplied purely by way of non-limiting example, wherein.

Figure 1:
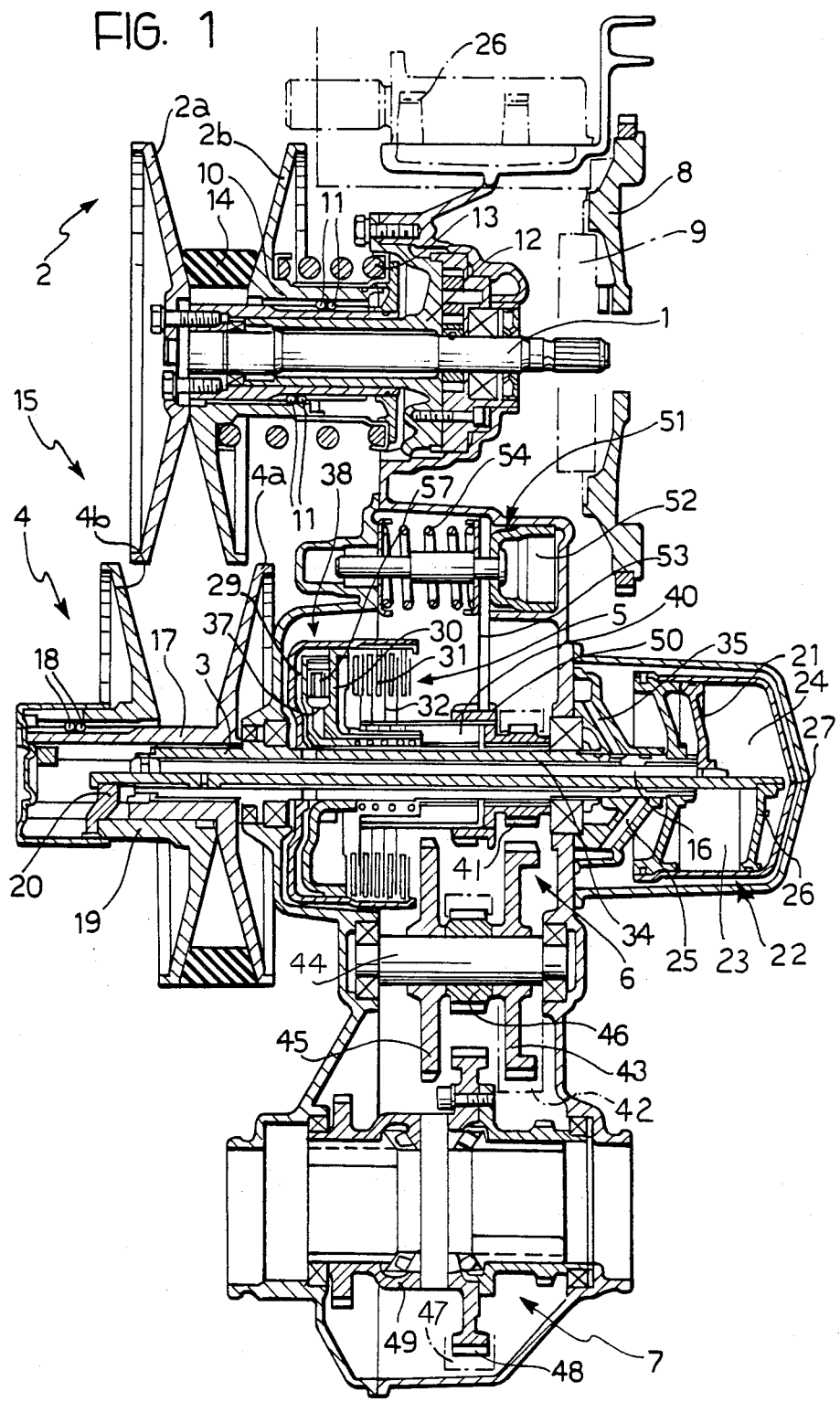
FIG. 1 is a diagrammatic view in longitudinal section of a stepless change-speed transmission according to the invention.

With reference to the drawings, the transmission according to the invention comprises essentially the following sub-units.

main shaft 1 with expansible driving pulley 2;

hollow driven shaft 3 with expansible driven pulley 4 and friction clutch 5;

geared reversing unit 6 for engaging forward drive and reverse;

epicyclic differential 7 for actuating the drive shafts (not illustrated) of the driven wheels of the vehicle.

The main shaft 1 which at one end receives drive from the engine in a conventional manner via a toothed input member 8 and a flexible coupling generally indicated 9, carries a fixed half-pulley 2a of the driving pulley 2 at its opposite end. The movable half-pulley 2b of the driving pulley 2 has a hub 10 coupled by means of drive balls 11 so as to be slidable axially on a tubular support 12 coaxial with the main shaft 1. The half-pulley 2b is acted on by a helical loading spring 13 which biasses it axially towards the fixed half-pulley 2a. The thrust exerted by the loading spring 13 is a maximum when the movable half-pulley 2b is furthest from the fixed half-pulley 2a (upper part of FIG. 1 relative to the axis of shaft 1—short ratio) and a minimum when the movable half-pulley 2b is closest to the fixed half-pulley 2a (lower part of the figure relative to the axis of shaft 1—long ratio). The movement of the movable half-pulley 2b between the two extreme positions is controlled by a driving V-belt 14 which passes around the driven pulley 4.

The driven pulley 4 which, together with the driving pulley 2 and the belt 14 constitutes a stepless speed variator 15, comprises a fixed half-pulley 4a having a hub 17 mounted on the hollow driven shaft 3 in which a rod 16 is coaxially slidable, and a movable half-pulley 4b slidable on the hub 17 with the interposition of drive balls 18. The half-pulley 4b has in turn a hub 19 coupled at 20 to the rod 16 which, as stated, is slidable in the driven shaft 3. The end of the rod 16 opposite the driven pulley 4 is fixed to a piston 21 of a hydraulic cylinder 22 the interior of which is divided by the piston 21 into a thrust chamber 23 and an equalizing chamber 24. The thrust chamber 23 is connected by ducts 25 to a circuit supplying pressurised hydraulic fluid, through a hydraulic control valve unit shown diagrammatically at 26. By means of the cylinder 22 it is possible to drive the sliding of the movable pulley 4b relative to pulley 4a between an extreme spaced-apart condition illustrated in the upper part of FIG. 1 relative to the axis of the rod 16, and an extreme contracted position illustrated in the lower part of the same figure with reference to said axis. With the sliding of the half-pulley 4b of the driven pulley 4, there is a corresponding sliding of the movable half-pulley 2a of the driving pulley 2 in the opposite direction, enabling a stepless variation of the transmission ratio to be obtained.

In the piston 21 an opening 66 is formed through which the thrust chamber 23 communicates with the equalizing chamber 24, and the latter communicates with the outside of the cylinder 22 through a vent duct 27. In this way, in operation, the two chambers 23 and 24 facing the piston 21 mutually cancel the centrifugal effect of the oil filling them, due to the rotation of the cylinder 22. This avoids undesirable variations in the speed ratio of the variator 15 due to any pressure increases due precisely to the centrifugal action.

Figure 2:
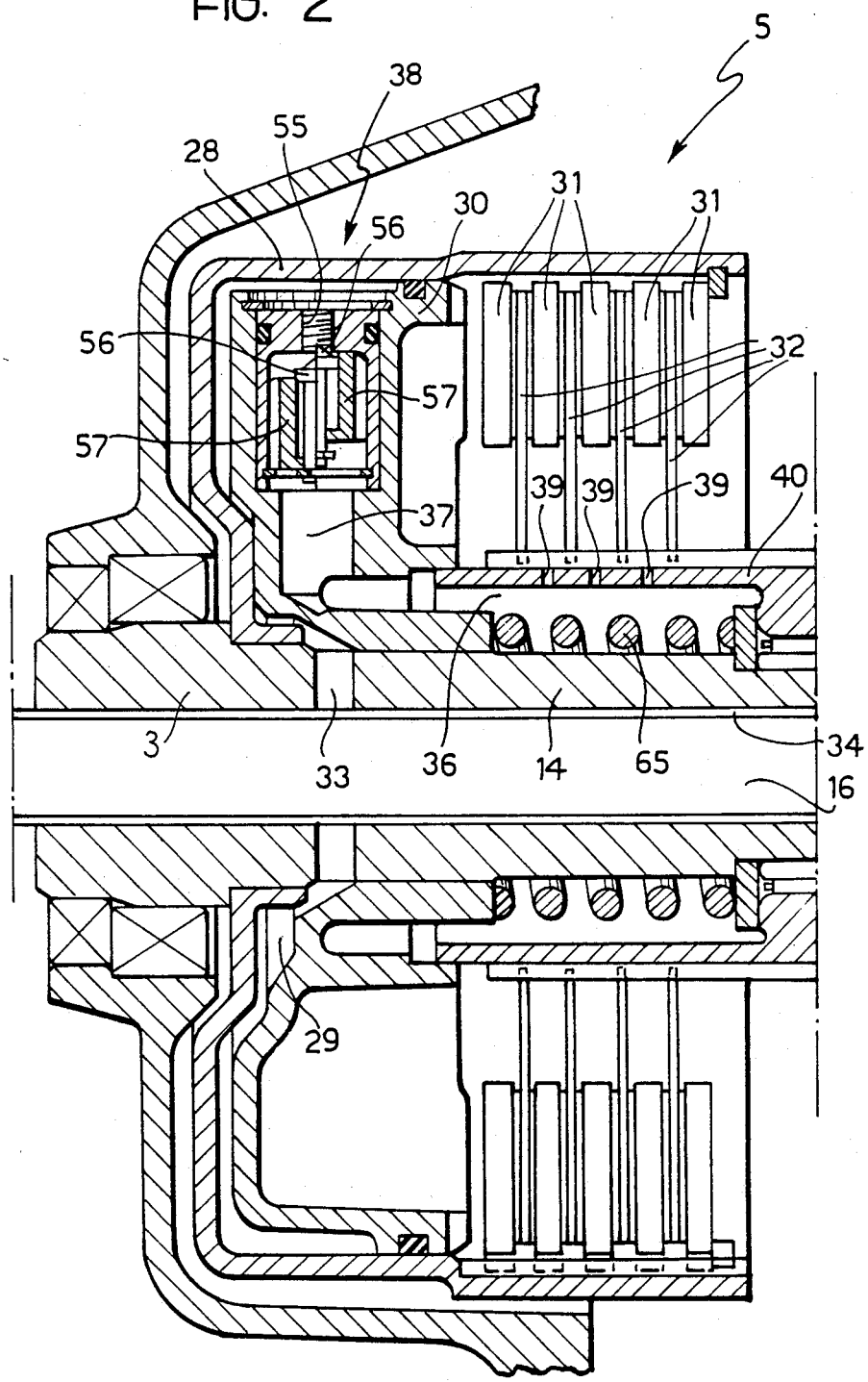
FIG. 2 shows a detail of FIG. 1 on a larger scale.

The friction clutch 5 includes a driving member 28 coupled for rotation with the driven shaft 3, and hence with the driven pulley 4, forming a hydraulic cylinder the thrust chamber 29 of which is defined by a piston 30 facing a series of annular driving friction discs 31 and driven discs 32, and pressed in a direction opposite the latter by a spring 65. The thrust chamber 29 communicates on the one hand with a circuit supplying a pressurized hydraulic fluid through inlet ducts 33, 34 and 35, and on the other hand with an exhaust duct 36 including a radial portion 37 in which a modulating valve 38 to be described below is inserted. The exhaust duct 36 communicates with the friction discs 31 and 32 through lubrication ducts 39 (FIG. 2).

The driven friction discs 32 are coupled for rotation with a toothed bush 40 rotatable on the shaft 3 and facing axially a driving gear 41 for forward drive, also rotatable on the shaft 3.

The driving gear 41 for forward drive is engaged, by means of a transmission chain 42, with a driven gear 43 for forward drive keyed on a counter-shaft 44 placed between the driven shaft 3 and the differential 7. Also keyed on the countershaft 44 are a driven gear 45 for reverse drive and a final reduction gear 46 engaged, by means of a transmission chain 47, with a final reduction crown gear 48 carried by the box 49 of the differential 7.

The gears 41, 43 and 45, together with a coupling toothed sleeve 50 slidable coaxially with the shaft 3, define the reversing unit 6. The sleeve 50 is normally arranged in the position illustrated in FIG. 1, in which it engages the toothed bush 40 on the one hand, and the driving gear 41 for forward drive on the other hand. In this way, the movement imparted by the main shaft 1 to the driven shaft 3 through the variator 15 and the friction clutch 5 is transmitted to the differential 7 by means of the forward drive gears 41 and 43 and the final reduction gears 46 and 48.

With the coupling sleeve 50 there is associated a hydraulic control device 51 having a thrust chamber 52 connected to a circuit supplying pressurised hydraulic fluid through the valve unit 26 to effect, by means of a transmission member 53, the axial displacement of the sleeve 50 towards the left, with reference to the Figure, against the action of a return spring 54. As a result of such a displacement, the sleeve 50 is disengaged from the driving gear 41 for forward drive and is engaged with the driven gear 45 for reverse drive. In this situation, the toothed sleeve 50 assumes the role of driving gear for reverse drive, and the motion imparted by the main shaft 1 to the driven shaft 3 through the variator 15 and the friction clutch 5 is transmitted to the differential 7 with a sense of rotation opposite the previous one.

In the example illustrated with reference to FIGS. 1 and 2, the modulating valve 38 conforms in shape to the valve described and illustrated in U.K. Patent Application GB No. 2151725A published July 24, 1985 and assigned to the same Assigness as the present application. It comprises a valve seat 55 which is formed at the outer end of the radial portion 37 of the exhaust duct 36 and with which there cooperates a valve shutter 56 with a conical surface supported by an axially-grooved centrifugal mass 57 freely slidable within the radial portion 37.

The centrifugal mass 57 is so arranged and sized as to effect the gradual closure of the valve seat 55 by the shutter 56, thus shutting off communication between the thrust chamber 29 and the exhaust duct 36 when the speed of rotation of the driven shaft 3 and therefore of the driving member 28 of the clutch 5 exceeds a predetermined threshold value.

Figure 3:
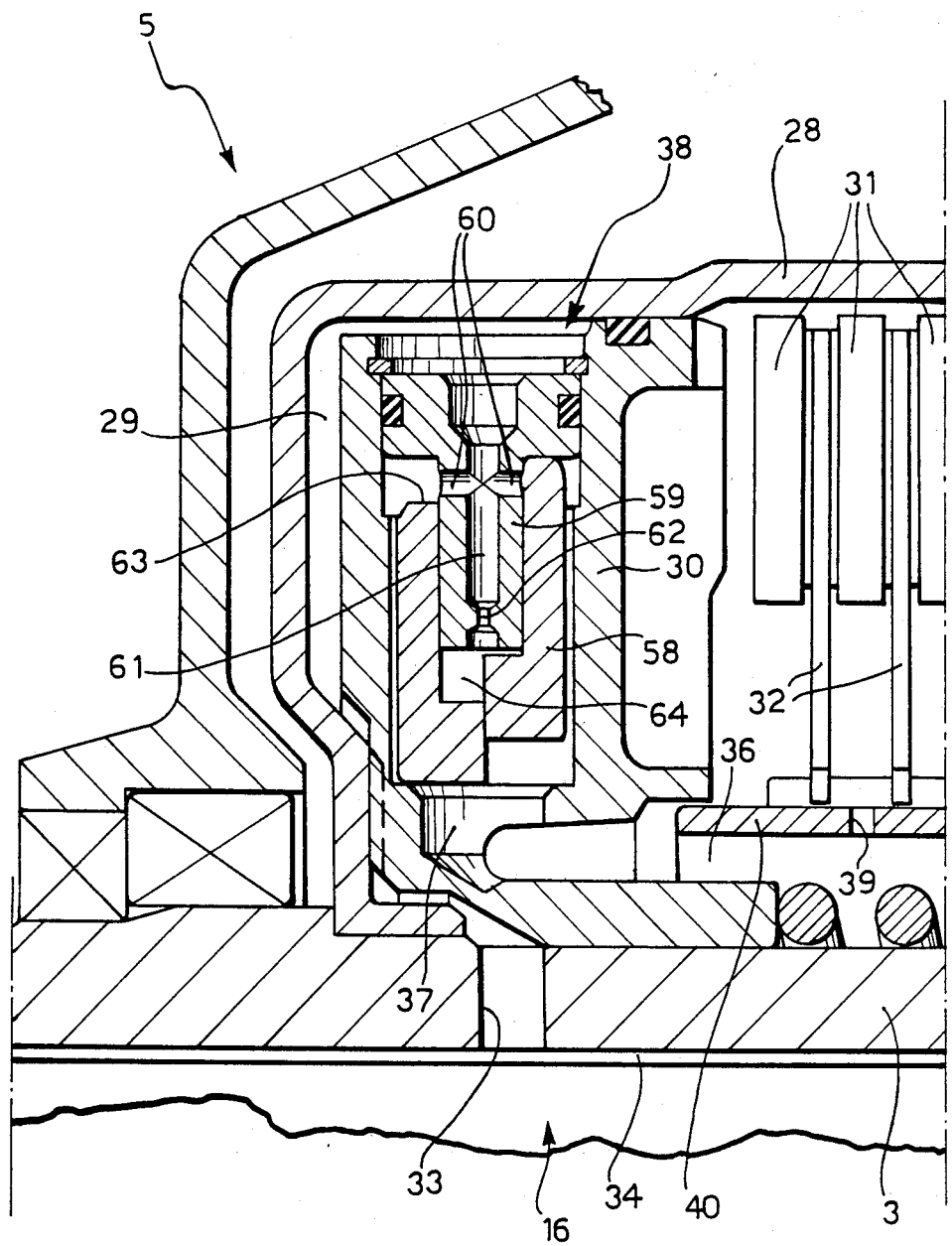
FIG. 3 shows a variant of FIG. 2.

In the variant illustrated in FIG. 3, in which parts identical with or similar to those described above are denoted by the same reference numerals, the centrifugal mass of the modulating valve 38 is constituted by a cup-shaped slide element 58 which is slidably engaged on a spigot 59 with a series of radial holes 60 and an axial hole 61 with a restriction 62. The circumferential edge 63 of the centrifugal mass 58 is tapered and acts as an annular shutter which cooperates with the outer ends of the radial holes 60, while the axial hole 61 communicates with the interior of the cavity of the mass 58, defining a thrust chamber 64. This chamber 64 performs an equalising function in use, in that the pressurised hydraulic fluid supplied to it through the axial hole 61 equalises the centrifugal force of the slide mass 58.

The above-described conformation and arrangement of the friction clutch 5 enables the clutch to perform the three functions which will be described below.

SEPARATING FUNCTION

The driven discs 32 of the friction clutch 5 are normaly separated from the driving discs 31 driven by driving member 28, because the control piston 30 is normally held to the left, with reference to the drawings, by the action of the spring 65. In this situation, the clutch 5 is disengaged and the reversing unit 6 is uncoupled relative to the variator 15, which permits forward drive or reverse to be selected by means of the hydraulic control 51. As stated above, forward drive is normally kept engaged by means of the spring 54, and reverse can be engaged by sending pressurised oil to the chamber 52 by means of the hydraulic control unit 26.

PULLING AWAY FUNCTION

To effect pulling away, pressurised oil is sent to the thrust chamber 29 by the hydraulic unit 26 through the ducts 35, 34 and 33. The thrust chamber 29 communicates, through the modulating valve 38, with the exhaust duct 37 and with the lubrication holes 39 through which oil is supplied to the friction discs 32 to cool them by the removal of frictional head generated in the slipping phase of pulling away.

Upon acceleration of the engine, the motion transmitted by the variator 15 in the short ratio rotates the driven member 28 at a gradually increasing angular velocity.

As a function of the square of the number of revolutions, the centrifugal mass 57 or 58 of the modulating valve 38 tends to move radially outwards, progressively cutting off the discharge of oil through the valve seat 55 or the holes 60. As a result, the oil pressure in the thrust chamber 29 increases gradually, causing the piston 30 to move towards the friction discs 31 and 32 until they are completely together.

When the modulating valve 38 closes completely, the pressure required in the thrust chamber 29 for the full engagement of the clutch 5 is established, while the lubrication of the disc 31 and 32 which are pressed together is obviously interrupted.

The configuration of the slide mass 58 according to FIG. 3 has the advantage of ensuring an improved synchronisation of the clutch 5 in the pulling-away phase, as a better ratio of the closure of the duct 37 to the increase of the pressure within the chabmer 29 is achieved due to the presence of the compensating chamber 64.

"AUTO-LOCK-UP" FUNCTION

The auto-lock-up function consists of preventing the disengagement of the clutch 5 below a predetermined speed and is obtained as a result of the positioning of the clutch at the output variator 15. In this way, the clutch 5 is independent of the transmission ratio of the pulleys 2 and 4, unlike traditional transmissions in which the friction clutch 5 is mounted on the main shaft.

Thus, the clutch 5 can be disengaged only below a predetermined speed of the vehicle. More particularly, the centrifugal clutch lock-up effect performed by the modulating valve 38 is achieved in such a manner that slipping occurs when the vehicle pulls away only as long as the vehicle speed is below 15–20 km.p.h. At higher speeds, the clutch 5 is engaged independently of the speed of rotation of the engine and of the transmission ratio of the variator 15. If the clutch were arranged on the main shaft 1, however, in the event of sudden braking with locking of the wheels in a long or intermediate ratio, the entire kinematic chain from the wheels to the driving pulley 2 would stop in an intermediate ratio without the possibility of shifting the drive belt 14 to a short ratio. In practice, under such conditions, it would no longer be possible to change the ratio and, on the subsequent restarting, the pulling away would not take place, as required, in the shortest ratio, and damage could occur to the drive belt and to the friction clutch. According to the invention, on the other hand, in the event of sudden braking of the vehicle with locking of the wheels and the variator 15 in a long or intermediate ratio, the friction clutch 5 opens automatically by centrifugal action through the modulating valve 38, while the pulleys 2, 4 and the engine continue to rotate, thus permitting the transmission ratio to be changed to the short value appropriate to the stoppage of the vehicle which can then be restarted without any problems.

The advantages of the transmission according to the invention will be evident from the preceding description; they may be summarised as follows:

improved functionality of the transmission obtained by arranging the components in the manner described and illustrated, particularly as regards the placing of the friction clutch 5 on the driven shaft 3 to obtain the "auto-lock-up" effect;

reduction of the number of components due to the design of the reversing unit 6 incorporated in the final reduction;

better and more reliable synchronisation in the pulling-away phase as a result of the use of the centrifugal modulating valve 38;

reduction of the manufacturing and assembly costs of the various components which can be pre-assembled in sub-units for prior inspection, which the consequent possibility of the automation of the assembly; and reduction of the overall size of the transmission.

Naturally, the principle of the invention remaining the same, the details of construction and forms of embodiment may be varied widely with respect to that described and illustrated, without thereby departing from the scope of the present invention.

I claim:

1. A stepless change-speed transmission between the engine and the drive shafts of the driven wheels of a motor vehicle, comprising a main shaft, an expansible driving pulley carried by the main shaft, a driven shaft, an expansible driven pulley carried by the driven shaft, a drive belt which passes around the driving and driven pulleys and hydraulic control means for varying the transmission ratio between the driving and driven pulleys, an epicyclic differential rotatable by the driven shaft to drive the drive shafts, a geared reversing unit for reversing the sense of rotation of the differential to effect forward or reverse drive respectively, hydraulic actuator means for controlling the reversing means, and a hydraulically-operated friction clutch for engaging and disengaging the transmission, the friction clutch being arranged on the drive shaft and including a driving member actuated by the driven pulley and a driven member for actuating the reversing unit, and the reversing unit comprising:

a driving gear for forward drive rotatably mounted on the drive shaft, transmission means and a driven gear for forward drive engaged with the driving gear for forward drive through said transmission means;

a toothed clutch sleeve coaxial with the driven shaft and coupled for rotation with the driven member of the friction clutch, the toothed sleeve normally being meshed with the driving gear for forward drive, and being displaceable axially by the hydraulic actuator means to a position of disengagement from the driving gear for the forward drive;

a driven gear for reverse able to mesh directly with the toothed clutch sleeve when the latter is in its disengaged position, and transmission means between said driven gear for forward and reverse drive and the differential;

wherein the friction clutch comprises an actuating cylinder fixed to the driving member of the clutch and defining a thrust chamber connected to a hydraulic supply circuit and a hydraulic exhaust duct housing a normally-open modulating valve, rotatable with the actuator and with centrifugal closing actuation;

wherein the modulating valve comprises a centrifugal mass slidable radially in the exhaust duct and carrying an obturator which cooperates with a valve seat formed in the exhaust duct; and wherein the centrifugal mass is constituted by a substantially cup-shaped slide with a tapering edge acting as an annular obturator and the interior of which defines a pressure chamber communicating with the hydraulic supply circuit with the function of balancing the centrifugal force acting on the centrifugal mass.

2. Transmission according to claim 1, wherein the exhaust duct communicates downstream of the modulating valve with lubricating ducts for the friction members of the friction clutch.

3. Transmission according to claim 1, wherein the obturator is conical.

4. Transmission according to claim 1, wherein said driven gears for the forward and reverse drive of the reversing unit are mounted on a countershaft interposed between the driven shaft and the differential and supporting a driving, reduction gear actuating a driven, toothed reduction member of the differential.

5. Transmission according to claim 1, in which the driving pulley of the speed variator comprises a fixed half-pulley and a movable of half-pulley, wherein, associated with the movable half-pulley, is a loading spring having a stiffness proportional to the speed ratio of the variator, said loading spring urging the movable half-pulley towards the fixed half-pulley.

6. Transmission according to claim 1, in which the driven pulley of the speed variator comprises a fixed half-pulley and a half-pulley movable by means of a hydraulic actuating cylinder, wherein said hydraulic actuator has a thrust chamber connected in series with a compensation chamber for the pressure variations in the thrust chamber due to the centrifugal effect.

* * * * *